J. E. FREDERICKSON.
PROCESS OF MAKING SECONDARY BATTERY PLATES.
APPLICATION FILED JAN. 21, 1909.
994,451.  Patented June 6, 1911.
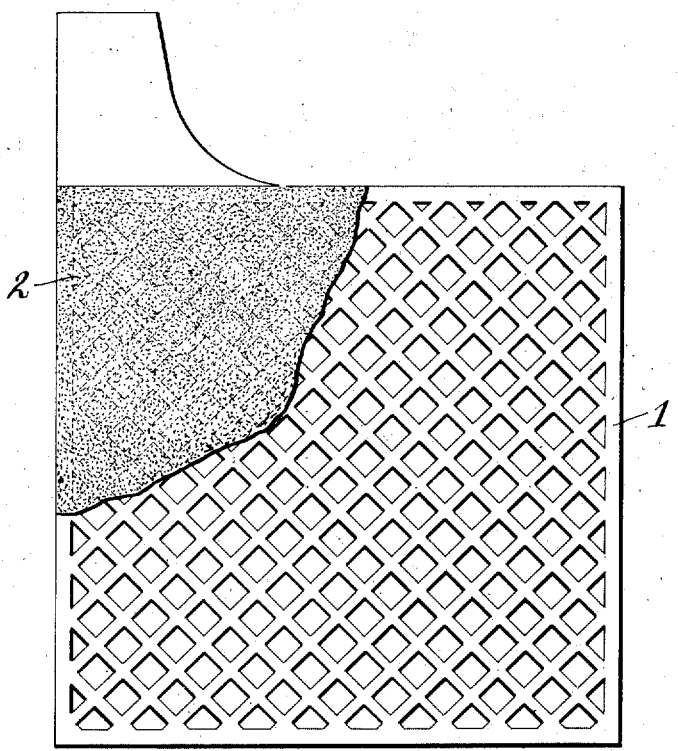
WITNESSES
M. E. Flaherty.
W. P. O'Brien.
INVENTOR
John E. Frederickson
by his atty
Charles Raymond DeCone

UNITED STATES PATENT OFFICE.

JOHN E. FREDERICKSON, OF REVERE, MASSACHUSETTS.

PROCESS OF MAKING SECONDARY-BATTERY PLATES.

994,451. Specification of Letters Patent. Patented June 6, 1911.

Application filed January 21, 1909. Serial No. 473,495.

*To all whom it may concern:*

Be it known that I, JOHN E. FREDERICKSON, of Revere, in the county of Suffolk and State of Massachusetts, a citizen of the United States, have invented a new and useful Improvement in Processes of Making Secondary-Battery Plates, of which the following is a full, clear, and exact description, reference being had to the accompanying drawings, forming a part of this specification, in explaining its nature.

The essential objects of my invention are to increase the life of the electrodes especially by preventing the formation or deposit of lead sulfate thereon or therein, which formation or deposit, as is well known, materially interferes with the proper chemical action of the electrodes and often causes buckling or breakage thereof; also, to provide electrodes having a relatively large capacity or amperage when charged.

It is a further object of my invention to provide electrodes in which the active material is of a relatively hard, tenacious substance which in the operation of the battery will not separate or become disassociated from the electrodes.

In the drawings I have shown a form of electrode like that I prefer to employ in practicing my invention, the electrode having the form of a plate which is only partially coated in order to show its ribbed body construction.

Referring to the drawings 1 represents a grid or support bearing active material 2 spread over the grid in and between the interstices thereof.

The plate shown for purposes of illustration may be regarded as either the positive or negative plate inasmuch as their physical characteristics are very much alike.

The positive plate is made as follows:—I take lead tetroxid or red lead and add to it a solution of soda ash (sodium carbonate) and water to form a thick paste. In making this paste I prefer that the solution of soda ash and water have a specific gravity of about 1125. This paste is then spread upon the grid and let dry for about an hour when the paste will have considerable inherent cohesiveness of substance. A grid made of any suitable material may be used, such lead having in it a small quantity of antimony. I then preferably give to the surface of the plate a coating of some quick-drying, alkali-proof paint for the purpose of forming a skin or casing for assisting in the retention of the paste and giving a chance for the formation of peroxid when the plate is immersed in a solution of soda ash and water and a current of electricity passed through the same as will hereinafter be explained. In connection with the quick-drying paint I would further explain that while the paint has nothing to do with the resultant plate or plates as such, yet it expedites the process of forming the plates which is a material consideration, the advantage of using the paint residing in the fact that one does not have to wait for the plates to become dry or partially dry before placing them in the solution. A coat of this paint acts as a retaining shell and enables one to put the plates in the solution right away or as soon as the paint has dried, the paint making a thin skin coating over the plates. Apart from being a quick-drying paint the paint should also have sufficient porosity when dry as to enable the solution and electric current to have access to the paste, at the same time keeping the paste from disintegrating and falling to the bottom of the holder or receptacle in which the plates are placed. In practice I have used an asphalt paint, meaning a paint composed of asphalt and benzin. This I have found to be an exceedingly good paint for the required purpose. Up to this point the negative plate is prepared in precisely the same way only I prefer to employ lead monoxid or litharge mixed with a solution of sodium carbonate and water to form the thick paste placed upon the grid. After the two plates have been prepared as aforesaid I immerse them both in a solution of sodium carbonate and water having preferably a specific gravity of about 1125. In placing the plates in this solution the positive and negative plates are preferably alternately arranged, all the negative plates being connected and all the positives. The plates so immersed are then charged by a current of electricity for about 40 hours when the plates are ready for use to form a battery. During the charging of the plates the positive plate becomes the more highly oxidized in lead peroxid and the negative plate changed to a metallic or spongy lead. This action tends also to harden the plates.

In forming the battery the plates are immersed in a solution of sulfuric acid and water and immediately charged for a period of about 8 hours when the positive plate will be more highly oxidized into lead oxid and the character of the negative plate will become further changed into metallic spongy lead. In connection with this further charging of the plates I would say that unless the plates are immediately charged when immersed in the diluted sulfuric acid, sulfate of lead is apt to form in and upon the positive plate and the acid may tend to disintegrate the negative plate. By immeditely charging the plates when immersed these objectionable features are entirely eliminated. Upon the discharge of the battery the plates are recharged when immersed in the diluted sulfuric acid; in other words, when the plates are recharged, they are not first immersed in the soda ash and water solution.

Electrodes formed according to the above described process have been found to be exceedingly efficient, the positive electrode being highly peroxidized and the metallic spongy lead of the negative electrode being very porous presenting a large surface to be acted upon by the electrolyte. In other words, both electrodes are of large capacity and are capable of supplying an exceedingly high amperage of current for a long time. The electrodes will not crack, expand, crumble or sulfate. In fact, sulfate will not form in or upon the electrodes on which account the electrodes may be used for many years. A further advantage resides in the fact that the active material in electrodes is very hard in substance and in fact needs no auxiliary support, which tends to the longevity of the electrodes. I prefer, however, to support the active material on grids to prevent accidental breakage of the electrodes by handling.

Having thus fully described my invention, I claim and desire to secure by Letters Patent of the United States:—

1. The process of forming electrodes for secondary or storage batteries which consists in mixing an oxid of lead with a solution of sodium carbonate into paste, applying said paste to electrodes, placing the electrodes in a sodium carbonate solution and passing a current of electricity through them until the electrodes are formed.

2. The process of preparing electrodes for secondary or storage batteries which consists in mixing an oxid of lead with a sodium carbonate solution to form a paste, applying said paste to electrodes and covering the paste so applied with a skin coating of some quick-drying, alkali-proof material and then placing the electrodes in a sodium carbonate solution and passing a current of electricity through them.

3. The process of preparing positive electrodes for secondary or storage batteries which consists in mixing tetroxid of lead with a sodium carbonate solution to form a paste, applying said paste to electrodes, placing the electrodes in a sodium carbonate bath and passing a current of electricity through them.

4. The process of forming negative electrodes for secondary or storage batteries which consists in mixing monoxid of lead with a sodium carbonate solution to form a paste, applying said paste to electrodes, placing the electrodes in a sodium carbonate solution and passing a current of electricity through them.

JOHN E. FREDERICKSON.

Witnesses:
JOHN E. R. HAYES,
M. E. FLAHERTY.